United States Patent
Kagami et al.

(10) Patent No.: US 7,969,623 B2
(45) Date of Patent: Jun. 28, 2011

(54) IMAGE-CAPTURING APPARATUS

(75) Inventors: Yuichi Kagami, Minamikoma-gun (JP); Fumihide Sakamoto, Minamikoma-gun (JP)

(73) Assignee: Nisca Corporation, Minamikoma-gun (JP)

( * ) Notice: Subject to any disclaimer, the term of this patent is extended or adjusted under 35 U.S.C. 154(b) by 756 days.

(21) Appl. No.: 12/061,063

(22) Filed: Apr. 2, 2008

(65) Prior Publication Data

US 2009/0091807 A1  Apr. 9, 2009

(30) Foreign Application Priority Data

Apr. 2, 2007 (JP) .................. 2007-096371

(51) Int. Cl.
*H04N 1/04* (2006.01)
(52) U.S. Cl. ......... 358/498; 358/496; 358/474; 358/497
(58) Field of Classification Search .................. 358/498, 358/496, 474, 497
See application file for complete search history.

(56) References Cited

U.S. PATENT DOCUMENTS

| | | | | |
|---|---|---|---|---|
| 6,101,283 | A | * | 8/2000 | Knox .............................. 382/254 |
| 6,438,350 | B1 | * | 8/2002 | Hasegawa et al. ............ 399/374 |
| 7,468,818 | B2 | * | 12/2008 | Suzuki .......................... 358/498 |

FOREIGN PATENT DOCUMENTS

JP   H11-055474 A   2/1999

* cited by examiner

*Primary Examiner* — Houshang Safaipour
(74) *Attorney, Agent, or Firm* — Judge Patent Associates

(57) ABSTRACT

Image-capturing apparatus meeting demands for high-image resolution and high-speed data capture during both still- and moving-document data-capture modes. Includes: a reading unit having first and second linear photoreceptors arrayed along an data capture sub-scanning direction, a delay circuit delaying output from the first photoreceptor, and an adding circuit adding delayed first-photoreceptor output to second-photoreceptor output; and a scanning unit illuminating from underneath the platen, and shiftable along it to guide linear reflected light from a document to the first and second photoreceptors. During a moving-document data-capture mode, the scanning unit is disposed in a data-capture position established at one edge of the platen to scan a document being conveyed, and when in a still-original data-capture mode, it is shifted from along the platen's opposite edge toward the one edge thereof to scan a stationary document.

10 Claims, 13 Drawing Sheets

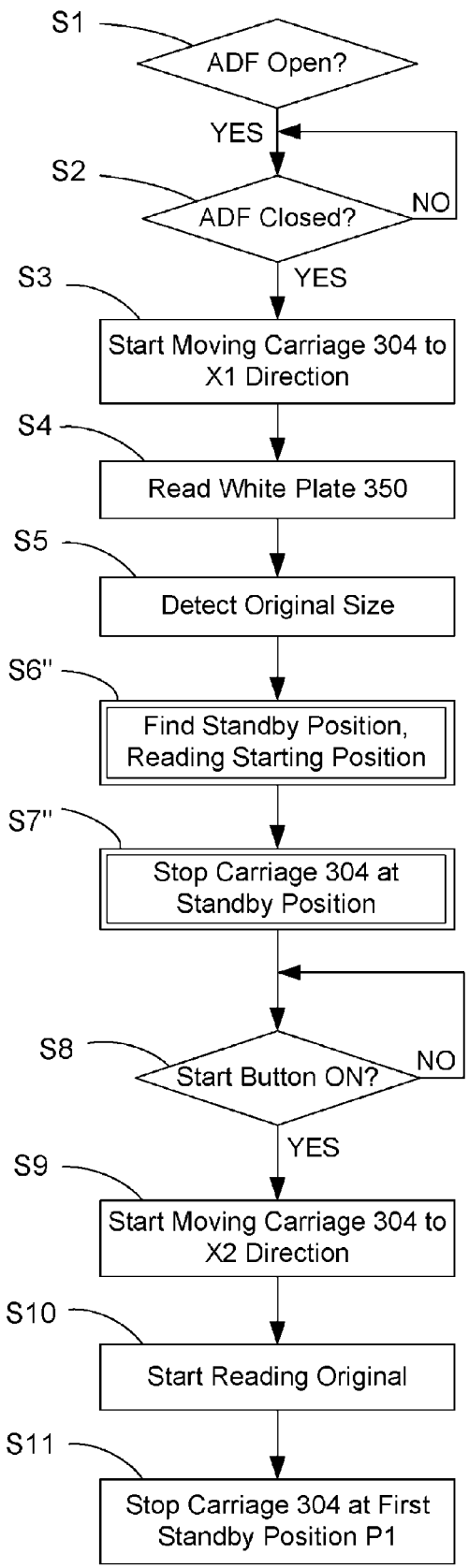

IMAGE-CAPTURING APPARATUS

BACKGROUND OF THE INVENTION

1. Technical Field

The present invention relates to image-capturing apparatuses that use linear image sensors to perform high-speed, high-quality capture of image information, and that have a still-original data-capture mode for capturing information from documents placed on a platen, and a moving-original data-capture mode for capturing information from documents conveyed from a document conveyance device.

2. Description of the Related Art

Image-capturing apparatuses installed in copiers, facsimile machines, etc. are of late increasingly being expected to manage both accelerated document-scanning speed and heightened image quality. Document image-data capture at high image quality and with exactitude is possible in practice by slowing the relative speed between the document and the data-capturing means that scans images on the document. On the other hand, if the relative speed is quickened, the level of electric charge output from the image sensors will drop, because the sensors' charge-storing time is shortened, inviting compromised image quality. Thus, the heightened speed and heightened image quality expected of image-capturing apparatuses are conflicting demands.

Against this backdrop, as a method to manage both heightened speed and heightened image quality in image data capture, apart from speeding up the data read-out rate at which data is read-out data from CCDs, document scanning by a plurality of scanning lines simultaneously is carried out. (Cf., for example, Japanese Unexamined Pat. App. Pub. No. H11-55474.)

The image-capturing apparatus set forth in JP H11-55474 is equipped with a linear sensor exemplarily furnished with two photoreceptors—a first photoreceptor and a second photoreceptor—in a row for capturing image data from documents, and therein is designed to realize high-quality image data acquisition and high-speed image data capture by delaying output from the first photoreceptor using a delay circuit, and by adding the delayed output from the first photoreceptor to output from the second photoreceptor.

Thus, the fact that the image-capturing apparatus set forth in JP H11-55474 is configured in such a way that of the two—the first and second—photoreceptors, one—the first photoreceptor—is furnished with a delay circuit means that either the image-capturing unit or the document original must necessarily be shifted in the direction in which the first photoreceptor captures original-document image data, ahead of the second photoreceptor. Put differently, the linear sensor has directionality.

Image-capturing apparatuses having an automatic document feeder (hereinafter termed "ADF" for convenience), however, ordinarily have two document-data capture modes—not just a still-document data-capture mode for capturing data from a document original placed on the platen, but also a moving-original data-capture mode as well, for capturing data from conveyed document originals. In an implementation in which the directions in which documents are scanned in these two modes are reversed, adopting the directionalized linear sensor set forth in JP H11-55474 would mean that the delay circuit could be used in only one of either of the data-capture modes.

Specifically, an implementation in which a delay circuit can be used in the moving-original data-capture mode will create a situation in which the circuit cannot be used in the still-original data-capture mode; conversely, an implementation in which a delay circuit can be used in the still-original data-capture mode will create a situation in which the circuit cannot be used in the moving-original data-capture mode. Consequently, to date it has not been possible to perform scanning at high speed and with high-image quality in both data-capture modes—the still-original data-capture mode and the moving-original data-capture mode.

BRIEF SUMMARY OF THE INVENTION

Therefore, an object of the present invention is to make available, in image-capturing apparatuses on which an ADF is installed, an image-capturing apparatus that meets both the two demands of high-resolution scanning and high-speed scanning, during still-original data-capture mode as well as during moving-original data-capture mode: in both of the document data-capture modes.

To achieve this object the present invention provides an image-reading apparatus furnished with: an image-reading unit having a platen on which originals are placed; and an original feeder disposed above the image-reading unit, for conveying the originals, the image-reading apparatus being characterized in that said document conveyance unit is equipped with: a sheet supply tray for carrying originals; conveyance means for conveying the originals form the sheet supply tray while turning the originals over from front to back; and a discharge tray disposed below the sheet supply tray and above the platen, for storing the originals conveyed by the conveyance means, the image-reading unit is equipped with: first and second line-shaped photoreceptors arranged side by side along a sub-scanning direction of image reading; a delay circuit that delays output from the first photoreceptor; a reading unit having an adding circuit that adds output delayed by the delay circuit, from the first photoreceptor and output from the second photoreceptor; a scanner movably supported along the platen to sequentially guide light reflected from the original placed on the platen to the first and second photoreceptors; a drive unit for moving the scanning unit; and a control unit for controlling the reading unit and the drive unit, the control unit controls the drive reading units so as to in the moving-original data-capture mode in which reading of the originals conveyed by said document conveyance unit is performed, stop the scanning unit at the reading position predetermined at a first end of the platen to read the conveyed originals, and controls the reading drive units so as to in the still original reading mode in which reading of the originals placed on the platen is performed, read the originals while moving the scanning unit from a second end of the platen to the first end thereof.

In this way, this image-reading apparatus is configured so that when in the still-original data-capture mode, the scanning unit is moved from the second end of the platen to the first end thereof (that is, toward a position where the scanning unit is arranged in the moving-original data-capture mode), in the reverse direction in conventional apparatuses. Therefore, such a configuration makes it possible to manage to increase resolution and to raise reading speed at the same time in both original reading modes, namely the still-original data-capture mode and the moving-original data-capture mode.

However, the still-original data-capture mode has two data-capture modes that can be selected. They are the addition data-capture mode that adds the output from the first photoreceptor and the output from the second photoreceptor; and a non-addition data-capture mode that uses only output from either the first or the second photoreceptor. Also, in the addition data-capture mode, the scanning unit is moved from another side of the platen to one side thereof to read a stationary original; in the non-addition data-capture mode, the scanning unit moves from one side of the platen toward another side to read the stationary original.

A blocking member for, when a document original is placed on the platen in this image-reading apparatus, the document to butt against edgewise to guide the document to its carrying position is arranged at the second end of the platen.

In addition, in this image-reading apparatus, first and second detection means for detecting the presence of the scanning unit are provided at the both ends of the scanning unit movement region. Also, a first standby position of the scanning unit is established at the first end of the platen, and a second scanning-unit standby position is established at the second end of the platen. When in the still-original data-capture mode, the scanning unit is moved toward the second standby position after the original is detected to be placed on the platen. This shortens the time required until the reading of the original starts. Also, when the system is switched to the moving-original data-capture mode, the scanning unit is moved toward the first standby position.

A reference member is provided in the image-capturing apparatus to obtain reference values for reading data. The reading unit obtains a first reference value and a second reference value of the reference member via the first and second photoreceptors while the scanning unit is moving toward the other side of the platen. The reading unit detects the size of the original placed on the platen while the scanning unit is moved toward the other side of the platen.

Furthermore, the original feeder constituting the image-reading apparatus of the present invention has a detection means for detecting whether the original feeder supported openably with respect to the platen is opened or not; detection of if originals have been placed on the platen is performed by this detection means.

Also, detection of an original placed on the platen can also be done by detecting that said document conveyance unit apparatus has been closed after it was opened over the platen.

In this way, this image-reading apparatus is configured so that the scanning unit is moved from the second end of the platen to the first end thereof when in the still-original data-capture mode so such a configuration makes it possible to realize managing to increase resolution and to raise reading speed at the same time in both original reading modes, namely the still-original data-capture mode and the moving-original data-capture mode.

BRIEF DESCRIPTION OF THE SEVERAL VIEWS OF THE DRAWINGS

FIG. 9 is an alternate embodiment of the operational control flowchart of the scanning unit 304 in the still-original data-capture mode.

DETAILED DESCRIPTION OF THE INVENTION

The following will now explain in detail embodiments of the image-capturing apparatus according to the present invention.

Figure 1:
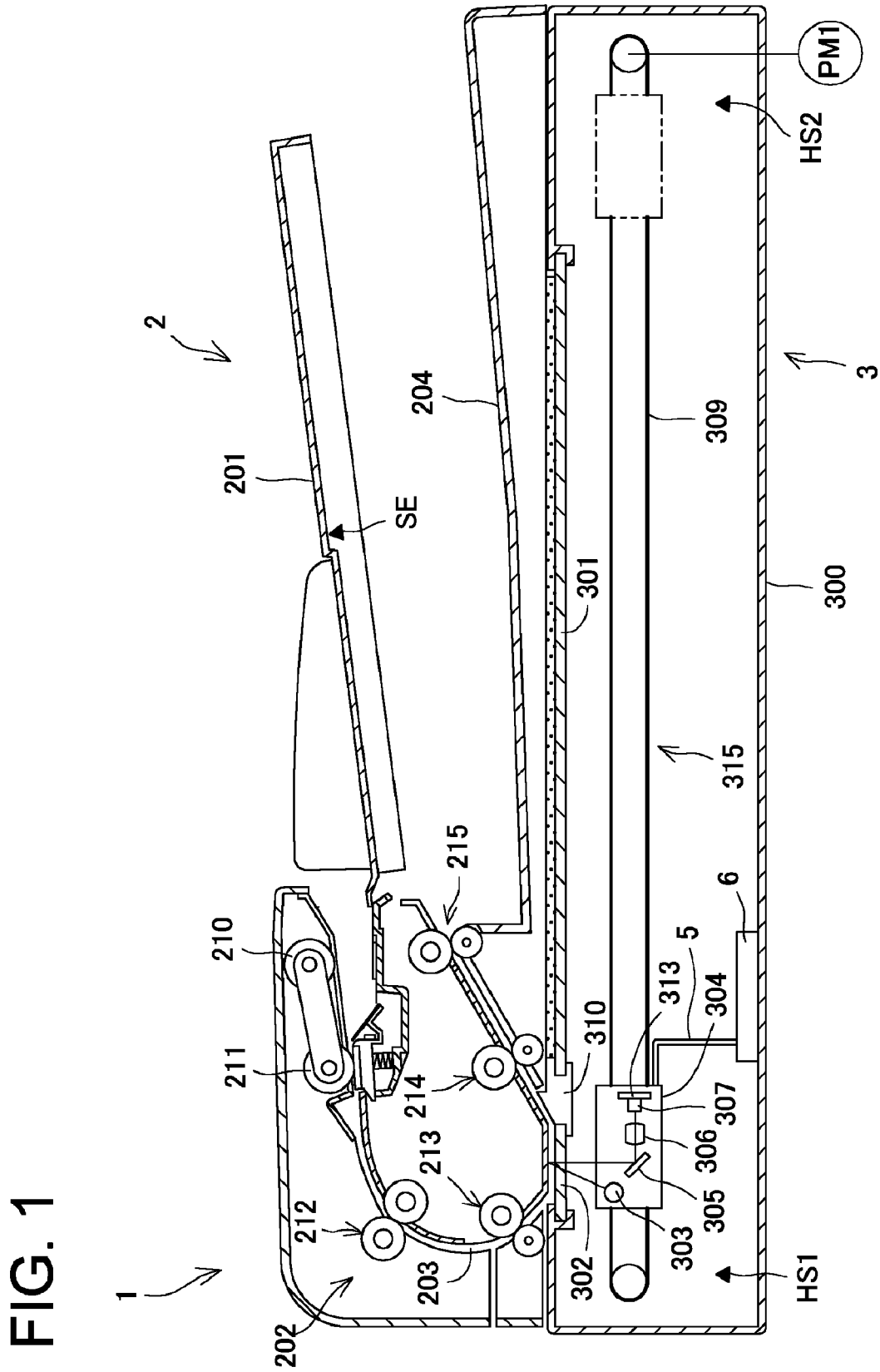
FIG. 1 is a view of the overall configuration of an image-capturing apparatus according to the present invention.

FIG. 1 shows an example of an overall configuration of the image-capturing apparatus. In FIG. 1, the image-capturing apparatus 1 is used as a stand-alone (hereinafter called a scanner) image-capturing device or as a reading unit of an image-forming apparatus such as a copier or the like, and is composed of an ADF 2 that is an original conveyance unit for conveying originals, and a scanner 3 used as an image-capturing unit for reading originals.

The ADF 2 is composed of an empty sensor ES that detects the presence of an original on a sheet supply tray 201; conveyance means 202 that conveys the original from the sheet supply tray 201; a conveyance path 203 that turns over originals conveyed by the conveyance means 202 and guides them downstream; and a discharge tray 204 that stores originals whose images have been read.

The conveyance means 202 is composed of: a pick-up roller 210 that sends out, one after another, originals stacked on the sheet feeding tray 201; a feed roller 211 that separates individually the originals sent one after another by the pick-up roller 210 and feeds them; a pair of registration rollers 212 that correct any skew in the conveyed originals and convey the originals further downstream along the conveyance path 203; a pair of conveyance rollers 213 that conveys the originals toward a window 302; a first pair of discharge rollers 214 and a second pair of discharge rollers 215 that convey the read originals toward the discharge tray 204; and a motor PM2 (see FIG. 2) that drives each of these rollers.

With this configuration, document originals placed on the sheet feeding tray 201 with surfaces to be read facing upward are sent one after the other by the pick-up roller 210, and then are separated into single sheets and fed by the feed roller 211. The originals are conveyed and turned over from front to back by the pair of registration rollers 212 and the pair of conveyance rollers 213. The images on the originals are then read at the reading window 302 serving as reading unit when in the moving-original data-capture mode. Also, the read original is then discharged to the discharge tray 204 by the first pair of discharge rollers 214 and a second pair of discharge rollers 215 with the read surface of the original facing downward.

Figure 6:
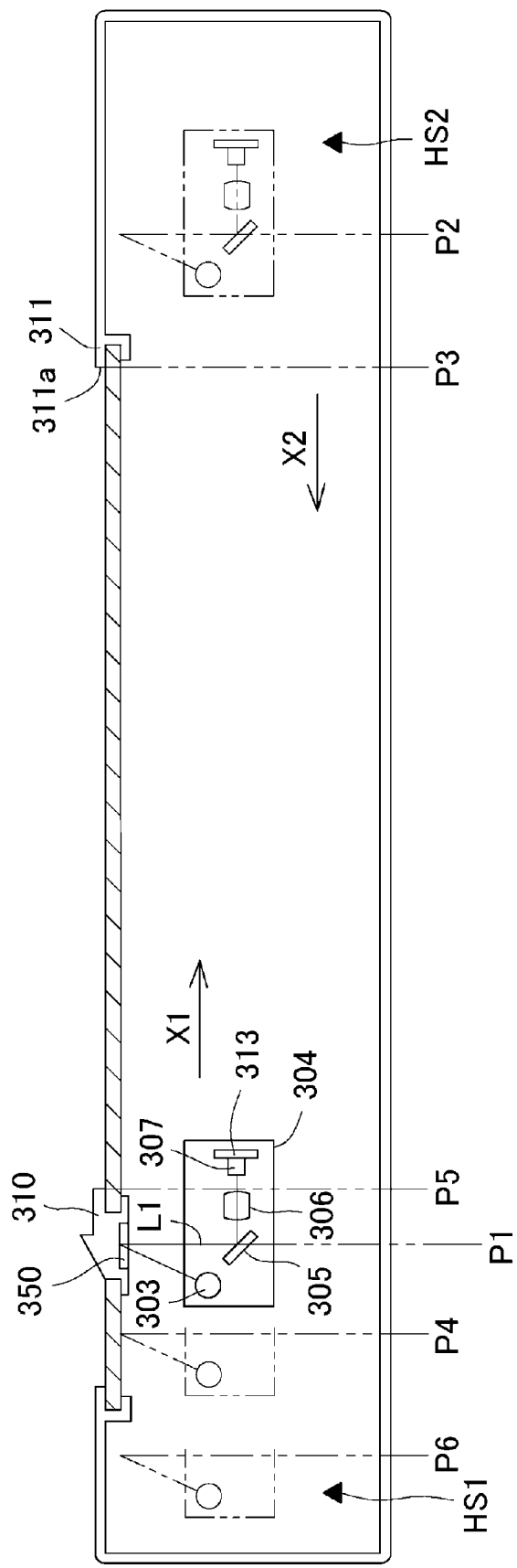
FIG. 6 is an explanatory view of operations of the scanning unit 304 in the image-capturing apparatus.

However, the scanner 3 has a platen 301 supported by a box-shaped frame 300 for placing the original; a second blocking part 311 (FIG. 6) disposed at an edge of the platen 301 for engaging an edge of the original placed on the platen 301; the window 302 composed of glass for reading the original conveyed by the ADF 2; a scanning unit 304 that supports a lamp 303 for irradiating light onto the original; drive means 315 for moving the scanning unit 304 along the platen 301; and an open detection sensor OCS. Also, as shown in FIG. 6, a white plate 350 for getting basic data as a reference for the image data is installed in the surface of the back side of a first blocking part 310 that scoops up a leading edge of the original conveyed by the ADF 2.

Also, in addition to the lamp 303, the scanning unit 304 is furnished with a mirror 305 that reflects light from the original; a lens 306 that converges light from the mirror 305; a sensor 307 fastened to a sensor substrate 313, that reads the light converged by the lens 306; and an A/D circuit 54 (FIG. 2) installed on the sensor substrate 313, that converts electric charges (analog signals) output from the sensor 307 into digital signals. Also, the drive means 315 is composed of general drive members such as the motor MP1, gears, and the belt 309 connected to the scanning unit 304, and the like.

Also, the scanning unit 304 is configured to reciprocate along the platen by the drive from the motor PM1 between a first home position detected by a first home position sensor HS1, and a second home position detected by a second home position sensor HS2. Also, image signals acquired by the sensor 307 are transferred from the sensor substrate 313 to the main unit substrate 6 via a cable 5.

Figure 11:
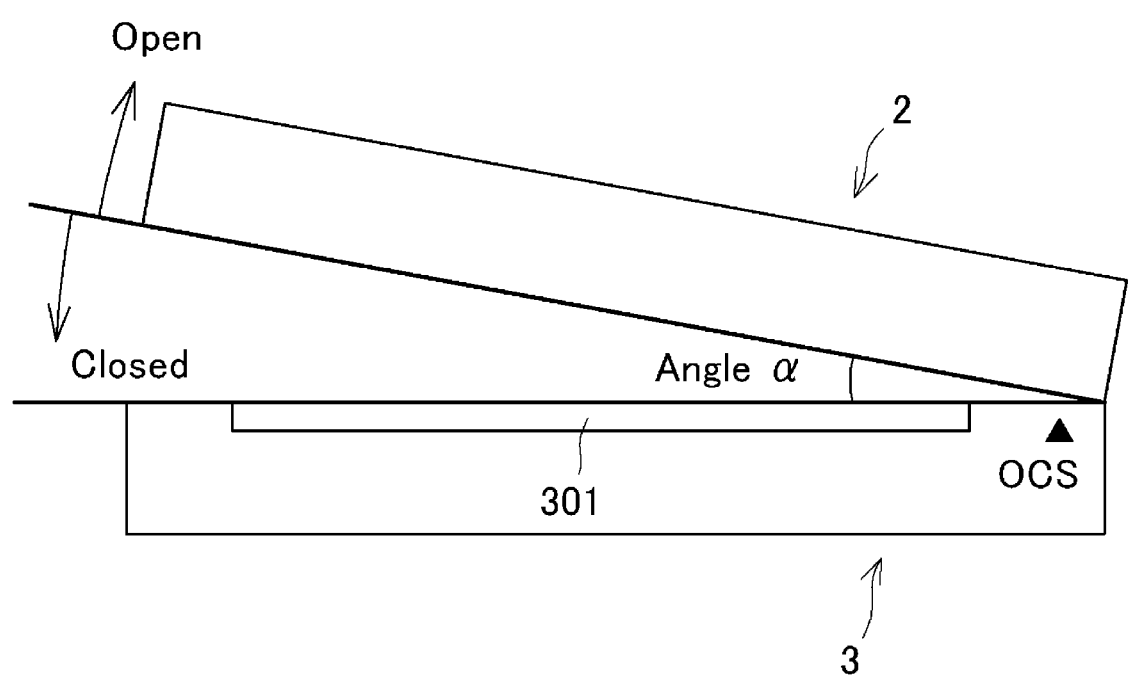
FIG. 11 is a view illustrating the open/close relationship of the ADF 2 with respect to the scanner 3 constituents of an image-reading apparatus of the present invention.

The ADF 2 can open and close over the platen 301 using a hinge. As shown in FIG. 11, the open detection sensor OCS detects whether an opening angle of the ADF 2 and scanning unit 304 is higher than a predetermined angle $\alpha$. When that opening angle is smaller than angle $\alpha$, it is determined that the ADF 2 is closed over the scanner. When that opening angle is larger than angle $\alpha$, it is determined that the ADF 2 is opened over the scanner.

Figure 2:
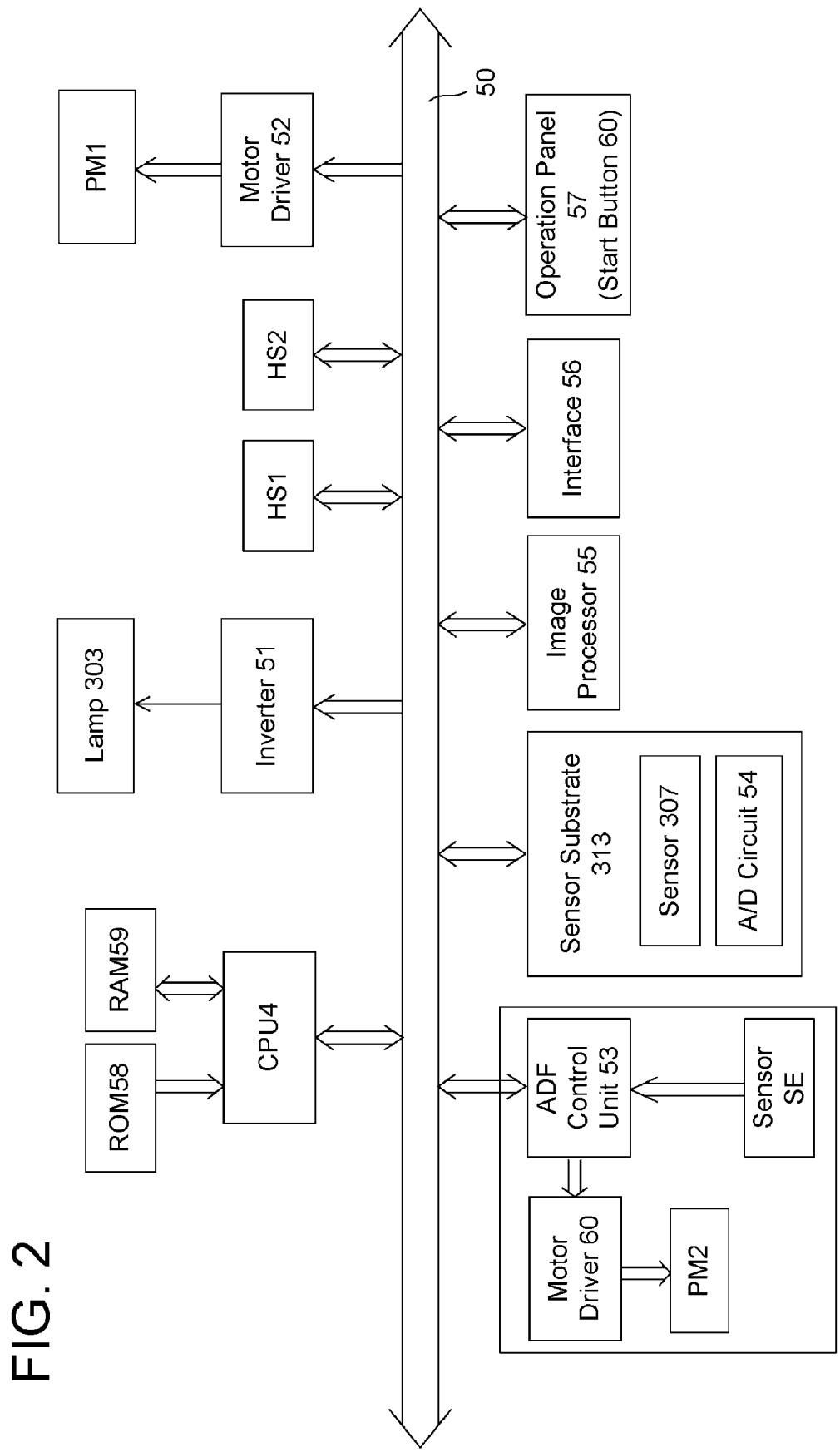
FIG. 2 is a block diagram of connection relationships of electrically configured elements that compose a control unit of the image-capturing apparatus 1.

FIG. 2 is a block diagram of connection relationships of electrically configured elements that compose a control unit of the image-capturing apparatus 1. In FIG. 2, a CPU4 (control unit) has via a bus line 50 an inverter 51, a motor driver 52, an ADF control unit 53, a sensor 307, and an A/D circuit 54, an image processor 55, an interface 56, a start switch 60, and an operation panel 57 that has a touch panel that enables selection of a data-capture mode such as color/B/W data-capture mode, and high-/low-image quality mode. Also, the image-capturing apparatus 1 is furnished with the first home position sensor HS1, and the second home position sensor HS2, and is connected to an external device (not shown) such as a copier or the like via the interface 50. Also, ROM58 and RAM59 are connected to the CPU4. Programs and fixed data that control the image-capturing apparatus 1 are each stored in predetermined address regions on the ROM58; variable data such as image data, and parameters are temporarily stored in RAM59.

When reading an original, the CPU4 drives the inverter 51 to light the lamp 303, and light from the original irradiated by the lamp 303 incidences into each of photoreceptors RS, GS, BS, and B/W of the sensor 307. After converted into digital signals in the A/D converter circuit 54, the analog electric charges generated in each of the photoreceptors are subjected to a correction process such as a line correction and gamma correction in the image processor 55, and are transferred as image data to the external device via the interface 56.

Also, the CPU4 moves the scanning unit 304 by driving the motor PM1 via the motor driver 52 according to the data-capture mode, resolution and magnification. Also, the CPU4 conveys the original by driving the motor PM2 via the ADF control unit 53, and the motor driver 60 according to the data-capture mode, resolution and magnification.

Figure 3:
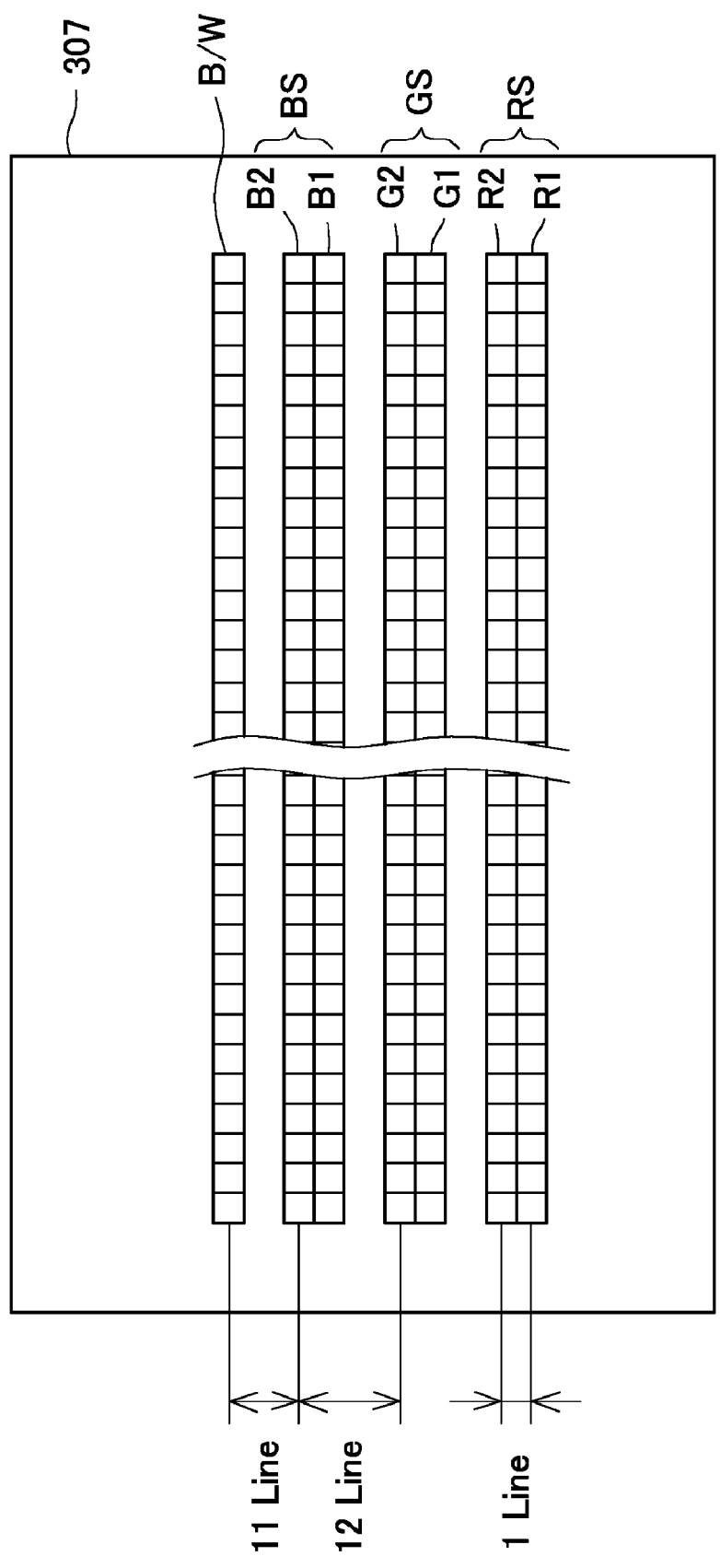
FIG. 3 is an explanatory view of a sensor 307 that composes the photoreceptor unit used in the image-capturing apparatus.

FIG. 3 is an explanatory view of a sensor 307 that composes the photoreceptor unit used in the image-capturing apparatus. As shown in FIG. 3, the sensor 307 is furnished with 4 line-shaped photoreceptors—that is, one black and white photoreceptor B/W in which a plurality of pixels are linearly arranged, for reading black and white, and three photoreceptors RS, GS, and BS for reading color. A film that allows substantially all light of the visible region of light to pass therethrough is attached to the incidence surface of the black and white receptor B/W. A film that allows only red wavelength light to pass therethrough is attached to the incidence surface of the red photoreceptor RS; a film that allows only green wavelength light to pass therethrough is attached to the incidence surface of the green photoreceptor GS; and a film that allows only blue wavelength light to pass therethrough is attached to the incidence surface of the green photoreceptor BS. Therefore, more light is let in the black and white receptor B/W compared with that in other photoreceptors because incident light is not restricted according to its wavelengths.

The photoreceptors of sensor 307 are composed of a first and second photoreceptors arranged parallel in sub-scanning direction; the red photoreceptor RS is composed of the first photoreceptor R1, the second photoreceptor R2; the green photoreceptor is composed of first photoreceptor G1, and the second photoreceptor G2; the blue photoreceptor is composed of first photoreceptor B1, and the second photoreceptor B2. The interval between the first photoreceptor and the second photoreceptor is equivalent to one line. Note that the interval between the first and the second photoreceptors in each of the color photoreceptors is equivalent to 12 lines; and the interval between the blue photoreceptor and black and white photoreceptor B/W is equivalent to 11 lines.

Figure 4:
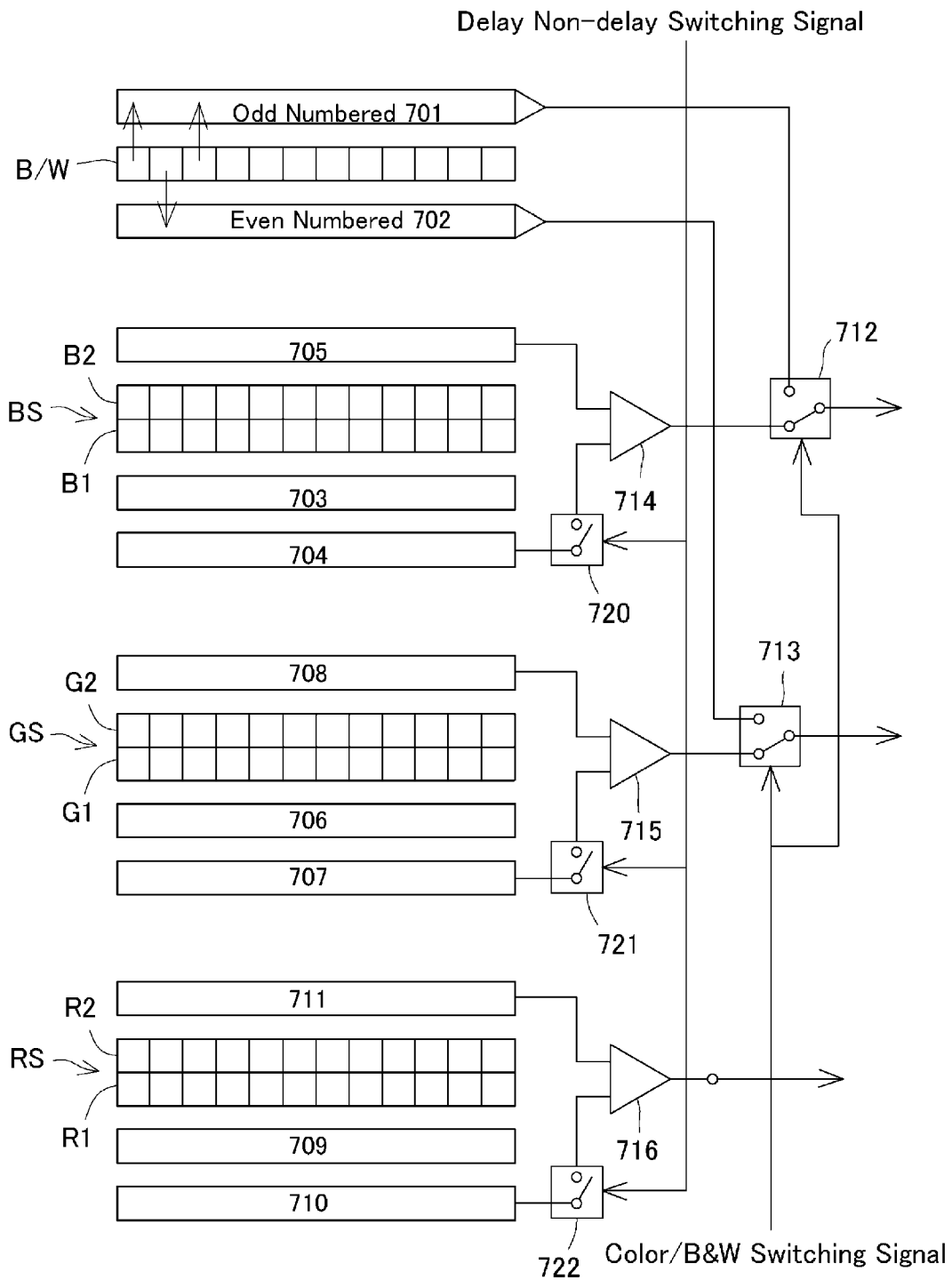
FIG. 4 is an example of an internal block diagram of the sensor 307.

FIG. 4 is an example of an internal block diagram of the sensor 307. In FIG. 4, a register 701 for transferring odd numbered pixels and a register 702 for transferring even numbered pixels are disposed in both sides of the black and white photoreceptor B/W.

Also, a storage register 703 (delay circuit) for temporarily accumulating electric charges equivalent to those in one line, accumulated in the first photoreceptor B1 to delay the electric charges is disposed outside the first photoreceptor B1 of the blue photoreceptor BS, a shift register 704 is disposed outside the storage register 703, and a shift register 705 is disposed outside the second photoreceptor B2. As in the photoreceptor BS, also in the photoreceptors GS and RS, storage registers 706, 709 (delay circuits) for temporarily accumulating electric charges accumulated in each of the first photoreceptors to delay the electric charges are disposed respectively outside the first photoreceptors G1, R1, and furthermore shift registers 707, 710 are disposed respectively outside the storage registers 706, 709. Additionally, shift registers 708, 711 are disposed outside the second photoreceptors G2, R2. Also, an adding circuit 714 that adds the electric charges from the shift registers 704, 705; an adding circuit 715 that adds the electric charges from the shift registers 707, 708; and an adding circuit 716 that adds the electric charges from the shift registers 710, 711 are formed. Switch circuits 720, 721, 722 are formed respectively between the shift register 704 and the adding circuit 714, between the shift register 707 and the adding circuit 715, and between the shift register 710 and the adding circuit 716. It is possible to switch to the addition data-capture mode and the non-addition data-capture mode. Here, the addition data-capture mode is a data-capture mode that adds output from the first photoreceptor G1 and the second photoreceptor G2; the non-addition data-capture mode is a data-capture mode that uses only output from the first photoreceptor G1 or the second photoreceptor G2.

Also, electric charges accumulated in the odd numbered pixels of the black and white photoreceptor B/W are output from the shift register 701, and the electric charge accumulated by the blue photoreceptor BS can be selectively output by the switch circuit 712. The electric charge accumulated by the even numbered pixels of the black and white photoreceptor B/W output from the shift register 702, and the electric charge accumulated by the green photoreceptor GS can be selectively output by the switch circuit 713. With the black and white data-capture mode, electric charges accumulated by the even and odd numbered pixels of the black and white photoreceptor B/W are output from the shift registers 701, 702; in color data-capture mode, the electric charges accumulated by the blue photoreceptor BS and the green photoreceptor GS are output.

The following will now explain sensor operations using the blue photoreceptor, with reference to FIG. 12.

FIG. 12 is an explanatory view of a transition of operating states of the sensor (a blue photoreceptor) in the image-capturing apparatus. FIG. 12(a) shows a state where electric charge is accumulated in the photoreceptors B1 and B2 (oblique lines), and in the storage register 703 (oblique lines). Here, by inputting a SCG (storage gate pulse) to sensor 307, the electric charge of the storage register 703 is transferred to the shift register 704.

Figure 12A:
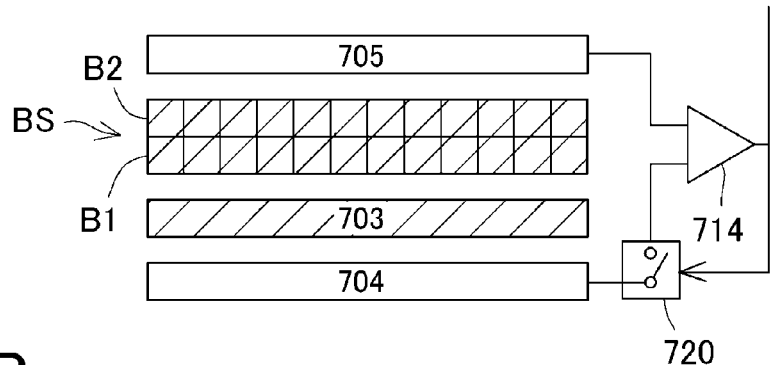
FIG. 12 is an explanatory view of a transition of operating states of the sensor (a blue photoreceptor) in the image-capturing apparatus.
Figure 12B:
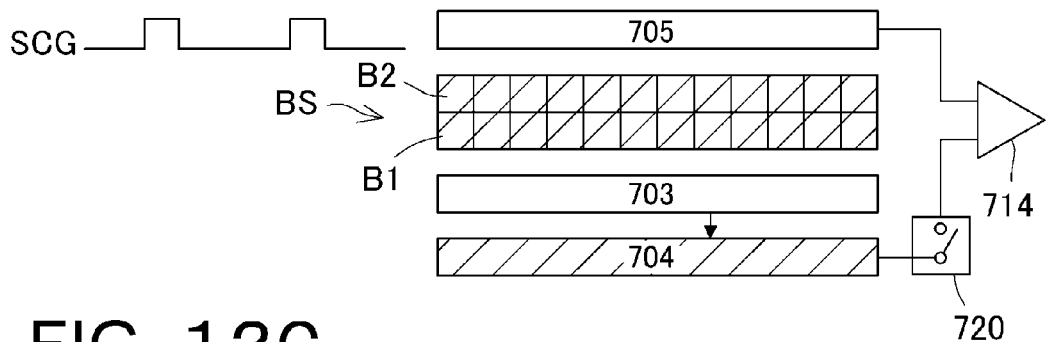
Figure 12C:
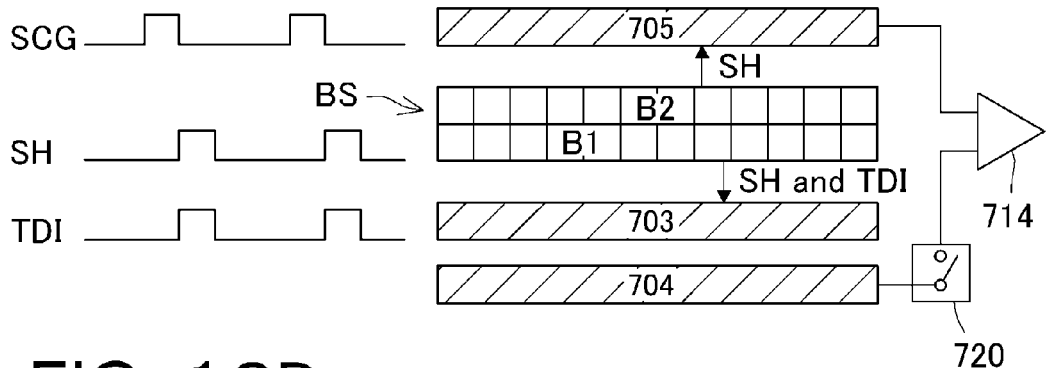
Figure 12D:
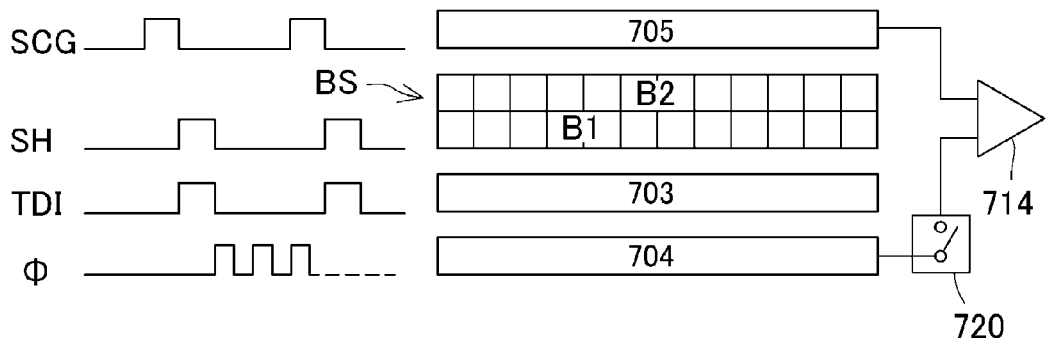

Also, as shown in FIG. 12(b), when data transfer is ended, the storage register 703 is empty. Next, as shown in FIG. 12(c), when a TDI gate pulse (TDI) and shift gate pulse (SH) are input to the sensor 307, the electric charge of the first photoreceptor B1 is transferred to the storage register 703, and the electric charge of the second photoreceptor B2 is transferred to the shift register 704. Also, as shown in FIG. 12(b), by inputting a shift clock Ø after the electric charges are transferred to the shift registers 704, 705, the electric charges of the shift registers 704, 705 are transferred to the adding circuit 714, and the electric charge is added. The explanation provided above relates to the blue photoreceptor, but the operations are the same for the green and red photoreceptors.

With such a configuration, electric charge accumulated in the black and white photoreceptor B/W is output in black and white reading mode, and electric charges accumulated in the photoreceptors RS, GS, and BS for color is output in color reading mode. Furthermore, in color reading mode, it is possible to select a high-resolution mode in which delayed electric charge from the first photoreceptor and electric charge from the second photoreceptor are added, and the low-resolution mode in which the delayed electric charge from the first photoreceptor and the electric charge from the second photoreceptor are not added.

In this way, the sensor that composes the photoreceptor in the image-capturing apparatus has directionality because it is equipped with storage (delay circuit) to temporarily store the electric charge only at one side of the photoreceptor. In other words, adding outputs from the two photoreceptors to use the added outputs requires arranging the sensor so that the first photoreceptor having the delay circuit reads images before the second photoreceptor reads them.

Figure 5:
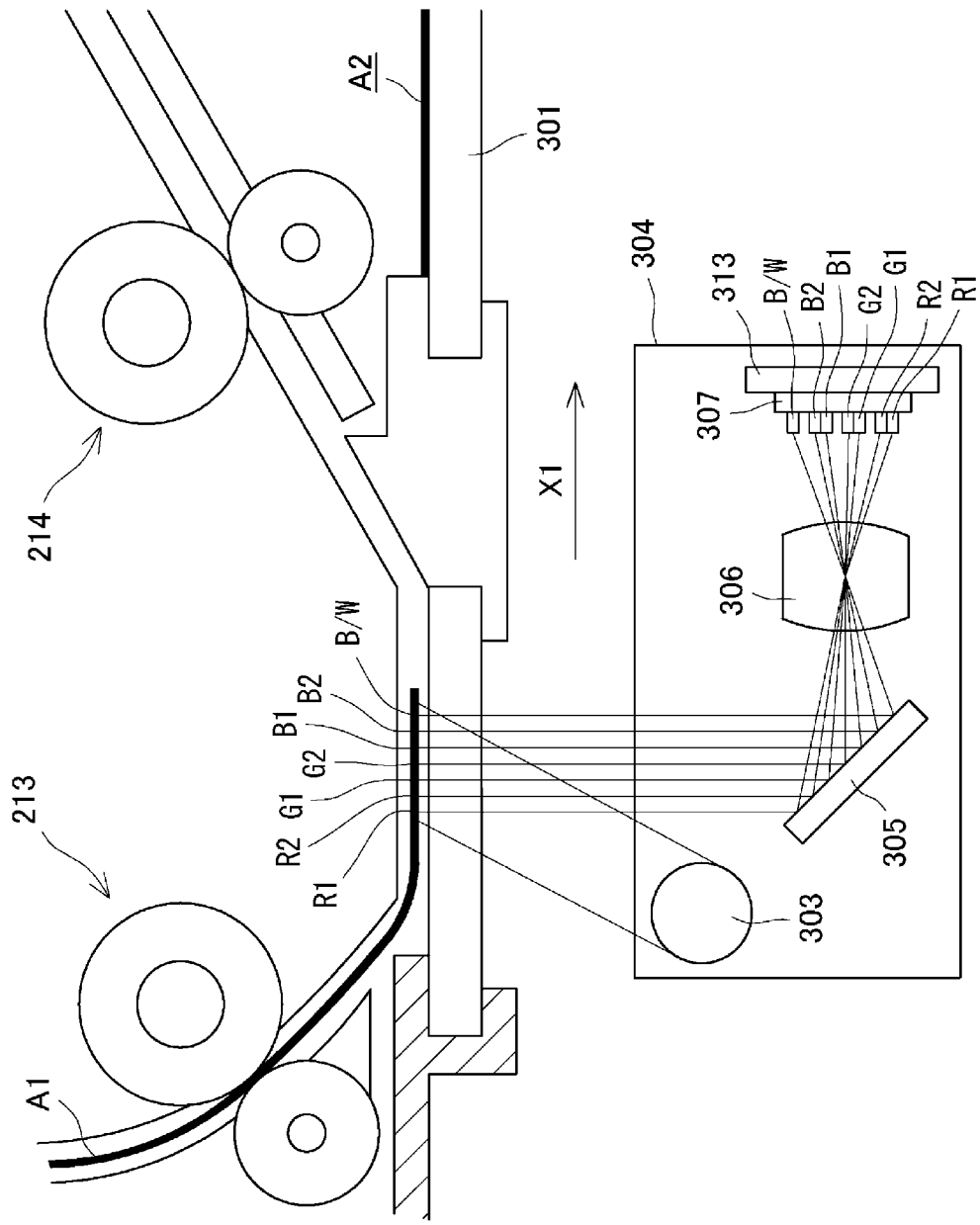
FIG. 5 is an explanatory view of an arrangement of the scanning unit 304 in a moving-original data-capture mode and a still-original data-capture mode, and an internal configuration of the scanning unit 304.

FIG. 5 is an explanatory view of an arrangement of the scanning unit 304 in a moving-original data-capture mode and a still-original data-capture mode, and an internal configuration of the scanning unit 304. As shown in FIG. 5, when in the moving-original data-capture mode in which the original A1 conveyed by the ADF 2 is read, the scanning unit 304 is disposed in a reading position established beneath the platen 301 alongside one end thereof (left side in FIG. 5).

Furthermore, the sensor 307 is installed with respect to the reading lines on the original so that the first photoreceptors (R1, G1, B1) for color read the original before the second photoreceptor (R2, G2, and B2) reads it. For that reason, it is possible to accumulate in the storage register 703 (delay circuit) electric charges equivalent to those in one line, from the first photoreceptors R1, G1, and B1 to delay the electric charges, and to add the delayed electric charges from the first photoreceptors R1, G1, and B1 to electric charges from the second photoreceptors R2, G2 and B2. Therefore, when in color data-capture mode, it is possible to attain high-image quality image data because it is possible to obtain twice the electric charge compared to when not using a delay circuit with the same accumulation time.

On the other hand, in the image-reading apparatus 1 of the present invention, when in the still-original data-capture mode in which reading of the original A2 placed on the platen 301 is performed, after the scanning unit 304 is moved in the direction of arrow X1 in FIG. 5, the original placed on the platen 301 is read while the scanning unit 304 is moved from the side of the second end to the side of the first end.

As reading of still-original in conventional apparatuses, an attempt to read the original while the scanning unit 304 is moved from the side of the first end (in other words, the side where the scanning unit 304 is arranged when in the still-original data-capture mode) to the side of the second end opposite form that side of the first end under the platen 301 means that the second photoreceptors (R2, G2, B2) read the original before the first photoreceptors (R1, G1, B1) reads it. At that time, as in the moving-original data-capture mode, it is not possible to accumulate in the storage register 703 (delay circuit) and delay the electric charges from the first photoreceptors (R1, G1, B1), and to add the delayed electric charges from the first photoreceptors (R1, G1, B1) to the electric charge from the second photoreceptor (R2, G2 B2). For that reason, with this image-capturing apparatus, if using the delay circuit with the still-original data-capture mode, the reading is conducted while moving the scanning unit 304 to the other side that is an opposite direction to the arrow X1 shown in FIG. 5, which is different from the prior art.

Next, the operations of the scanning unit 304 in the image-capturing apparatus will be explained with reference to FIGS. 6 and 7.

FIG. 6 is an explanatory view of operations of the scanning unit 304 in the image-capturing apparatus. FIG. 7 is an operation control flowchart of the scanning unit 304 in the still-original data-capture mode.

In FIG. 6, when the main image-capturing apparatus power is turned on, initial adjustments such as an image data gain adjustment and the like are implement. Thereafter, the scanning unit 304 enters a stand-by state in which it is stopped at the first standby position P1. At that time, the reading line L1 of the sensor 307 is above the white plate 350.

Figure 7:
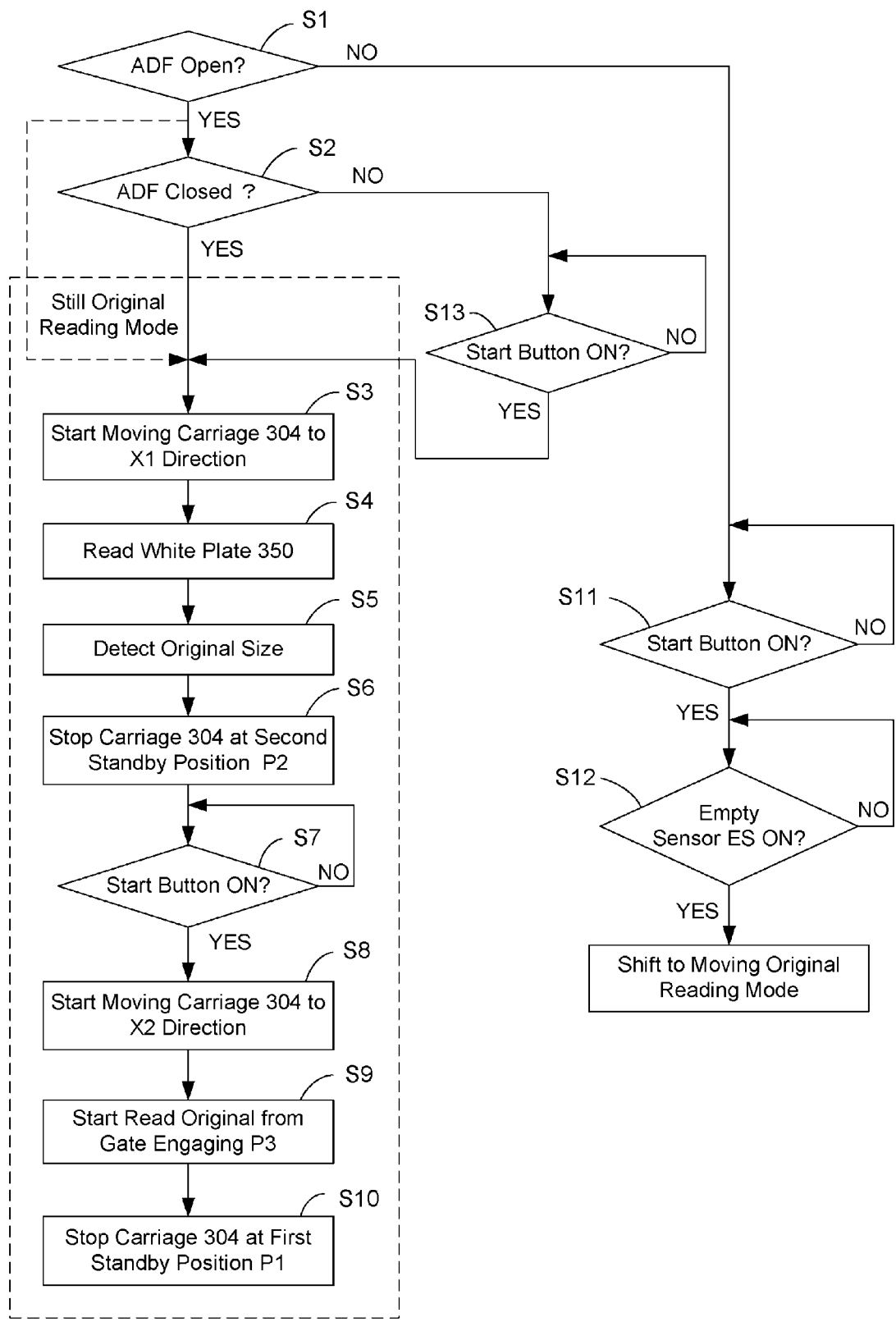
FIG. 7 is an operational control flowchart of the scanning unit 304 in the still-original data-capture mode.

As shown in FIGS. 6 and 7, the open detection sensor OCS detects that the ADF 2 is open (in other words, the angle at which of the ADF 2 opens with respect to the platen 301 is beyond a predetermined angle α) (step S1 in FIG. 7). When it has been detected that the ADF 2 has been closed again (step S2) (the angle is less than the predetermined angle α), the control unit of the image-capturing apparatus 1 drives the motor PM1 thereby starting the movement of the scanning unit 304 in the direction of the arrow X1 (a direction toward the other side of the platen (step S3). In such control in steps S1 and S2, it is determined from the detection of the opening/ closing of the ADF 2 that the user bumps an edge of the original into the second blocking part 311 and places the original on the platen 301.

Next, while the scanning unit 304 is being moved, the lamp 303 is lit, and the data (white reference data) of the white plate 350 is acquired (step S4). Acquisition of the white reference data is done by connecting the switch circuits 712, 713 shown in FIG. 4 to the register 701 for transfer of the odd numbered pixels of the black and white photoreceptor B/W and to the register 702 for transfer of the even numbered pixels, and connecting the switch circuits 712, 713 to the registers 705, 708 of the blue and green photoreceptors BS and GS after acquiring white reference data for the black and white data-capture mode performed by reading the white plate 350 with the black and white photoreceptor B/W, connecting the switch register 720 to the side that connects the shift register 704 and adding circuit 714, the switch register 721 to the side that connects the shift register 707 and adding circuit 715, and the switch circuit 722 to the side that connects the shift register 710 and adding circuit 716, setting the delay circuit, and acquiring the white reference data for the color data-capture mode by reading the white plate 350 with the color photoreceptors RS, GS, and BS. Also, the size of the original on the platen 301 is detected by driving the sensor 307 while the lamp 303 is lit (Step S5).

Next, the drive of the motor M1 is stopped when the second home position sensor HS2 detects the scanning unit 304. At this time, the scanning unit 304 is positioned at the second idling position P2 while being detected by the second home position sensor HS2 (step S6). The second idling position P2 is the furthest point in the X1 direction in the region in which the scanning unit 304 moves, and also is the second home position because the position at which reading of the original is started is determined based on this second idling position detected by the second home position sensor HS2.

Next, if the start signal from the start button is detected (step S7), the control unit (FIG. 2) drives the motor MP2 to move the scanning unit 304 in the direction of the arrow X2 shown in FIG. 6 (step S8), and drives the sensor 307 to start reading the original from an abutting position P3 of an original abutting surface 311a of the second blocking part 311 (step S9).

Here, in the black and white reading mode, the switch circuits 712, 713 shown in FIG. 5 are connected respectively to the register 701 for transferring the odd numbered pixels, and to the register 702 for transferring the even numbered pixels, in the black and white photoreceptor B/W to read the original with the black and white photoreceptor B/W and obtain image data for the black and white reading mode.

Also, in the color data-capture mode, the switch circuits 712, 713 connect to the registers 705, 708 of the blue photoreceptor BS and the green photoreceptor GS, the switch circuit 720 connects to the side that connects the shift register 704 and adding circuit, the switch circuit 721 connects to the side that connects the shift register 707 and adding circuit 715, and the switch circuit 722 connects to the side that connects the shift register 710 and adding circuit 716, and set to use the delay circuit, the switch circuit 720 is connected to shift register 705 side, the switch circuit 721 is connected to the shift register 708 side, the switch circuit 722 is connected to the shift register 711 side, set to use the delay circuit, and acquire image data for the color data-capture mode by reading the original using the color photoreceptor RS, GS and BS. Note that it is necessary for the movement speed from the abutting position P3 of the scanning unit 304 to be a speed that corresponds to original resolution and magnification so the distance from the second idling position P2 to the abutting position P3 is set to an adequate length for the scanning unit 304 to reach its maximum reading speed at the abutting position P3 when it first accelerates after the second idling position P2.

Next, when the reading line L1 has reached the document edge along the first blocking part 310 (once the reading line L has traveled the length of the document), reading is terminated, and the scanning unit 304 is moved to the first standby position P1 and the motor PM1 is stopped (step S10). Here, during the movement from the original reading ending position to the first standby position P1, it is acceptable for the movement to be at a speed faster than the reading speed.

In this way, if the status of the ADF 2 (being open or closed) is detected, moving the scanning unit in a direction toward the second end of the platen ADF 2 to shift the scanning unit to a position that is closer to the original reading starting position (the original abutting position) enables shortening the time required until the original reading starts in the still-original data-capture mode. Particularly in this embodiment, it is possible to shorten the time until the start of reading in the still-original data-capture mode by having the scanning unit standby at the second standby position P2 until the reading start signal (command) is detected.

In this image-capturing apparatus 1, the processing time for image data is shortened, and the movement of the scanning unit is effectively utilized by reading the white plate 350 to acquire basic data before the scanning unit 304 reaches the second idling position P2.

Note that if the determination is negative at step 2, control is put into the still-original data-capture mode (step S13) by the start signal (command) and control steps S3 to 10 set forth in FIG. 7 are carried out. Also, in the moving-original data-capture mode, the system shifts to the still-original data-capture mode by detecting the status of the ADF (whether opened or closed) and the movement of the scanning unit to the second idling position P2 started, but it is possible to shift to the still-original data-capture mode and execute steps S3 to 10 shown in FIG. 7, by detecting that the ADF 2 is open as indicated by the dotted lines in FIG. 7.

Figure 8:
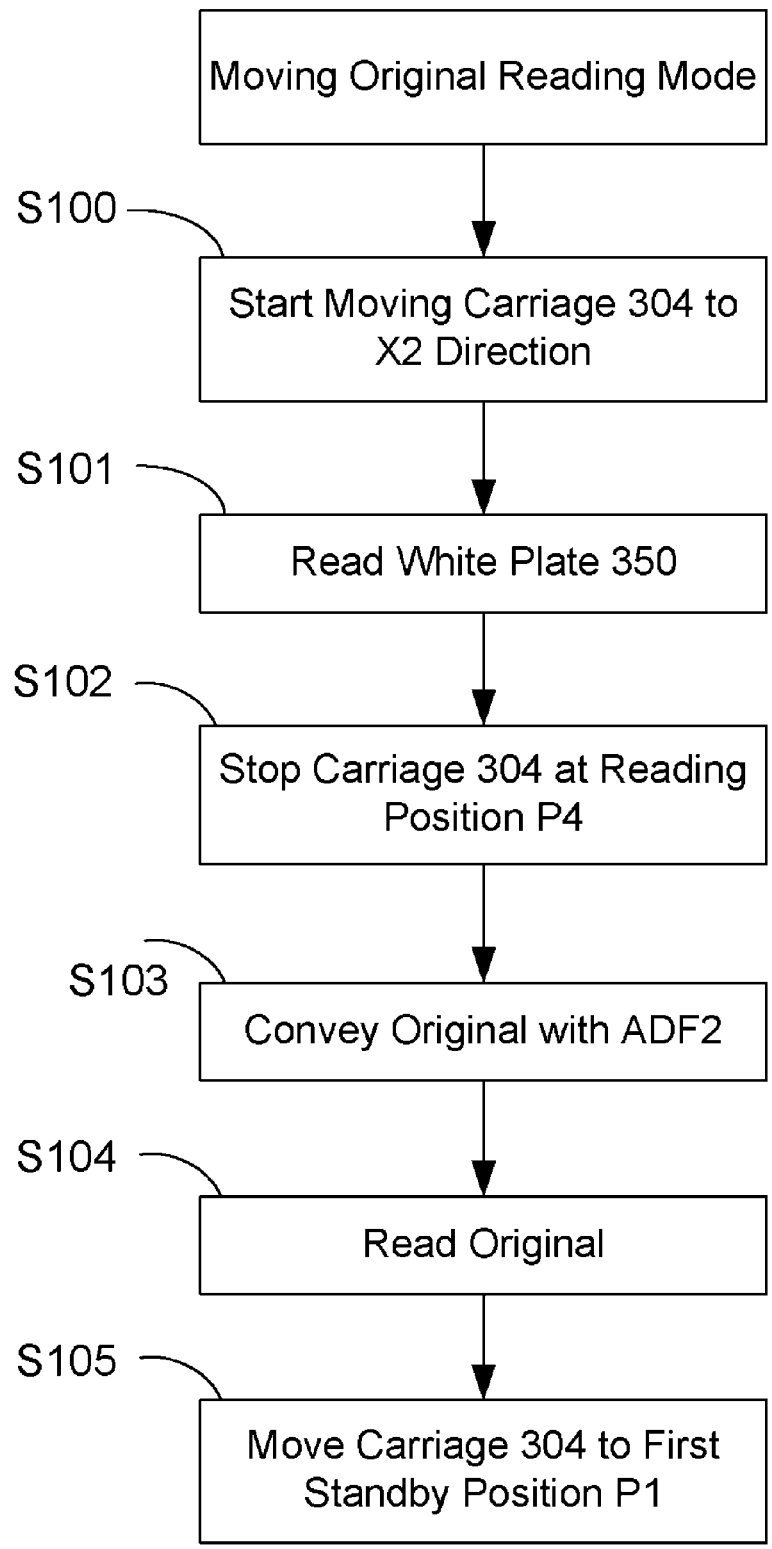
FIG. 8 is a flowchart to explain operations of the moving-original data-capture mode in the image-capturing apparatus.

FIG. 8 is a flowchart for explaining operations in the moving-original data-capture mode in the image-reading apparatus. When the result is a negative determination at step S1 shown in FIG. 7, the start signal (command) has been detected (step S11), and it is has been detected that the empty sensor ES is ON and an original has been set in the sheet supply tray 201 (step S12), the system shifts to the moving-original data-capture mode.

As shown in FIG. 8, in the moving-original data-capture mode, first the motor PM1 is driven, and the scanning unit 304 that is standing by at the first standby position P1 starts moving (step S100) to the direction of the arrow X2 in FIG. 6. Next, the lamp 303 is lit while the scanning unit 304 is being moved, and the white plate 350 is read (step S101). When the white plate 350 is detected by the first home position sensor HS1 (step S102), the control device (FIG. 2) of the apparatus stops the motor MP1 (step S103). At this time, the scanning unit 304 is positioned at the end directed along the arrow X2 of the region in which the scanning unit 304 moves and is detected by the second home position sensor HS2. Next, the motor PM1 is driven to move the scanning unit 304 in the X1 direction (step S104) and the scanning unit 304 is stopped at the reading position P4 (step S105).

Note that the reading position P4 is determined from detection of the first home position sensor HS1, as, for example, after the predetermined number of pulses is counted from when the first home position sensor HS1 is turned off. Also, the ADF 2 motor PM2 is driven to start conveying the original on the sheet supply tray 201 (step S106), and the sensor 307 is driven to read the original passing over the reading window 302 (step S107).

Here, if in the color data-capture mode, images are read using the color photoreceptors RS, GS and BS and the delay circuits; if in the black and white data-capture mode, reading is done using the black and white sensor B/W. When the reading of the original is ended, the scanning unit 304 moves to the first standby position P1.

As described above, in the still-original data-capture mode, moving the scanning unit in the direction in which the scanning unit heads for the reading position (P4) in the moving-original data-capture mode to read the original placed on the platen enables it reading the original using the delay circuits even in the still-original data-capture mode thereby making it possible to obtain high-quality images.

By positioning the scanning unit 304 standby position between the reading position P4 in the moving-original data-capture mode and the platen 301, and arranging the white plate 350 there, it is possible to obtain reference data by reading the white plate 350 before reading the original for either mode, so the reading of original data can be performed efficiently.

Also, when moving-original data-capture mode this image-reading apparatus is in the moving-original data-capture mode of, after the scanning unit 304 is returned to the first home position detected by the first home position sensor HS1, it is moved to the reading position P4 in the opposite direction (X1 direction) again. By determining the reading position P4 based on the detection of the first home position sensor HS1, highly precise positioning of the reading position P4 is possible. However, it is also acceptable to move the scanning unit 304 from the first standby position P1 to the reading position P4.

FIG. 9 is an alternate embodiment of the operation control flowchart of the scanning unit 304 in the still-original data-capture mode.

With the flow of operational controls shown in FIG. 7, the second blocking part 311 is disposed at a platen edge that is on the opposite side of the reading position P4 of the moving-original data-capture mode. An edge of original is abutted against the gate, to place the original on the platen 301, so it is acceptable to start reading the original from the abutting position P3 when in the still-original data-capture mode.

On the other hand, in an example of the flow of operational controls shown in FIG. 9, an explanation will be made of using the first blocking part 310 disposed on the platen edge of the reading position P4 side of the platen 301, as shown in FIG. 6, as the second blocking member, and using that abutting surface as a second gate position P6.

With the flow of operational controls of the scanning unit 304 shown in FIG. 9, an original is read using delay circuits and adding circuits while moving the scanning unit 304 in the X2 direction when in the still-original data-capture mode, but the scanning unit 304 standby position and the reading starting position are different from the example shown in FIG. 7. In other words, with the example of the flow of operational control shown in FIG. 7, the distance of the second idling position P2 and abutting position P3 is set so that the speed of movement of the scanning unit 304 from the abutting position P3 is adequate even at the maximum speed, and the scanning unit is stopped to standby at the second idling position P2 until it receives the start command, when in the still-original data-capture mode.

On the other hand, with the example of the flow of operational controls shown in FIG. 9, the scanning unit standby position is different according to the length of the original and the reading speed. In other words, the reading starting position, the moving speed during reading, and the distance necessary for acceleration to the moving speed are found at step S5 in FIG. 9 from the results of detecting the original size, and from the resolution and magnification information to determine the scanning unit 304 standby position and the reading starting position (step S6") and the scanning unit 304 is moved to the calculated standby position (step S7"). Also, in the same way as the flow of operational controls described in FIG. 7, after receiving the reading start command from the start button (step S8), the scanning unit 304 is moved in the X2 direction (shown in FIG. 6) (step S9), and reading of the original starts from the reading starting position found at step S6" (step S10).

Figure 10A:
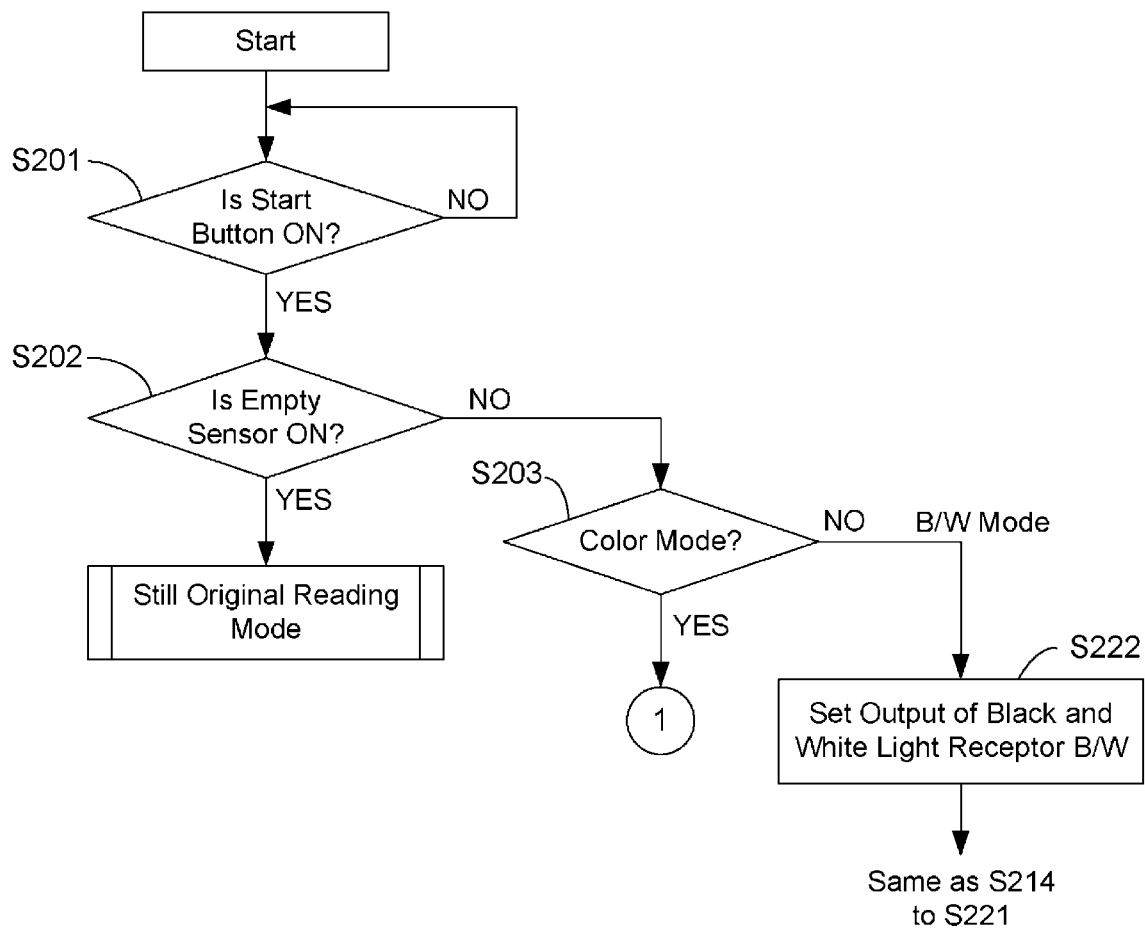
FIG. 10 is an operation control flowchart to explain an alternate embodiment of the still-original data-capture mode and the moving-original data-capture mode according to the present invention.
Figure 10B:
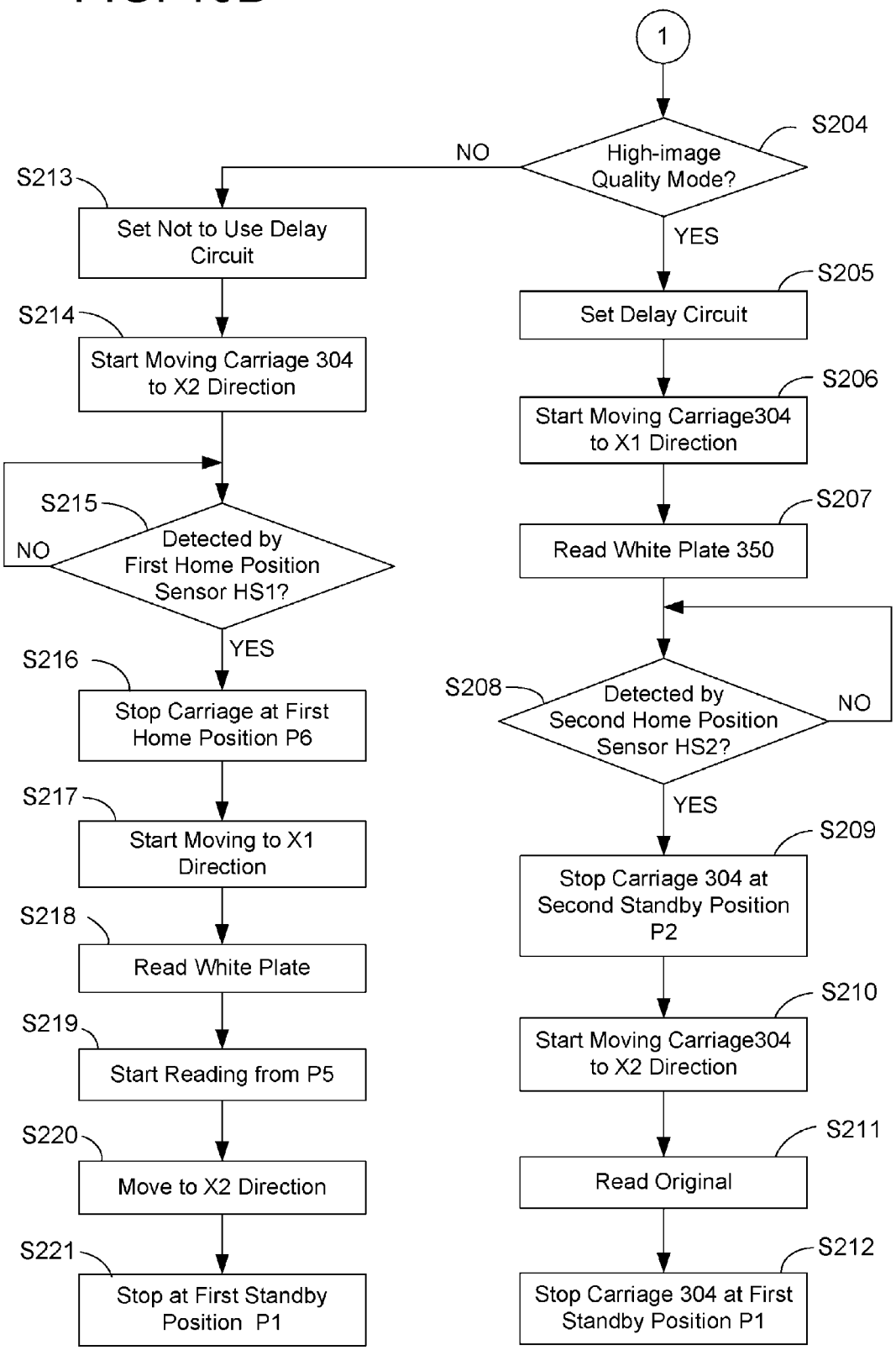

FIG. 10 is an operation control flowchart to explain an alternate embodiment of the still-original data-capture mode and the moving-original data-capture mode according to the present invention. In FIG. 10, the reading start command is received by means of the start button (step S201), and when an original is detected to be on the sheet feeding tray with the empty sensor ES being turned ON (step S202), the still-original data-capture mode is established, and the operational controls similar to those shown in FIG. 8 are carried out. Also, when a negative determination is made, the still-original data-capture mode is established in step S202, and the following flow of operational control is started.

In FIG. 10, it is determined whether the user has selected the color data-capture mode (step S203). If that determination is negative, it is determined that the high-quality image mode has been selected (step S204). When the high-quality image mode is selected, the switch circuits 712, 713 are connected respectively to the register 705 of the blue photoreceptor BS, and to the register 708 of the green photoreceptor GS, and after setting the switch circuits 720, 721, 722 in the same way as described above, to the mode to use the delay circuits (step S205), the motor PM1 is driven to start moving the scanning unit 304 stopped at the first standby position P1 to the direction of arrow X1 (step S206). Next, the data (white reference data) of the white plate 350 is acquired (step S207) by lighting the lamp 303 and moving the scanning unit 304.

Also, the size of the original is detected while the movement of the scanning unit 304 in the X1 direction is continued, and when the scanning unit 304 is detected by the second home position sensor HS2 (step S208), the motor M1 is stopped so the scanning unit 304 is stopped at the second idling position P2 (step S209). Next, the motor M1 is driven in reverse to start moving the scanning unit 304 from the second idling position P2 to the X2 direction (step S210) to read the original images while the scanning unit 304 is moving (step S211). In this case, reading is performed while using the delay and adding circuits. When the reading of the original is ended, the motor M1 is stopped, and the scanning unit 304 stops at the first standby position P1 (Step S212).

In a negative determination at step S204, if the low-image quality mode is selected, the switch circuit 712, 713 are connected to the registers 705, 708 side of the blue photoreceptor BS and the green photoreceptor GS, the switch circuits 720, 721, 722 are opened to set not to use the delay circuits (to set to use only output from the shift registers 705, 708, 711) (step S213). Next, the motor MP1 is driven to start moving the scanning unit 304 standing by at the first standby position P1 to the direction of arrow X2 in FIG. 6 (step S214), and when the first home position sensor HS1 was detected (step S215), the motor PM1 is stopped (step S216). At this time the scanning unit 304 is positioned at the first standby position P1.

Next, the motor PM1 is driven to move the scanning unit 304 in the X1 direction (step S217), the lamp 303 is lit while the scanning unit 304 is being moved (step S218), and the white plate 350 is read to start reading the original from the second standby position P5 (step S219). When the reading of the original is ended, the scanning unit 304 is moved in the X2 direction (step S220), and is returned to the first standby position P1 to be stopped (step S221).

When the determination is negative at step S203, and if the black and white reading mode is selected, the switch circuits 712, 713 are connected to the register 701 that transfers the odd numbered pixels of the black and white photoreceptor B/W and to the register 702 that transfers the even numbered pixels to set so that the output electric charge from the black and white photoreceptor B/W is output. The subsequent step is the same as steps S214 to 221. Therefore, explanations of these steps will be omitted.

Note that in each of above explanations of the moving-original data-capture mode, examples in which the delay circuits/adding circuits are employed are provided. However, it is acceptable not to provide them when the low-resolution data-capture mode is selected, or not using the delay circuits/adding circuits when the low-resolution data-capture mode or high-resolution data-capture mode is selected.

In the explanation above, storage registers as delay circuits were provided between the first photoreceptors of the reading sensors and the shift registers, but the locations for the delay circuits are not limited there to, if they are able to temporarily store and delay electric charges. Also, the delay circuits and adding circuits each targeted analog signals (electric charges), but it is also acceptable to delay and add digital signals. Also, one line of the electric charge is delayed and added, but it is also acceptable to delay and add electric charges of more than one line. In such a case, the sensor will increase in size for that increase in the number of lines, but it will be possible to acquire good, high-resolution images with the same reading time (accumulation time).

What is claimed is:

1. An image-capturing apparatus comprising an image-capturing unit having a platen for carrying document originals, and a document conveyance unit disposed above the image-capturing unit, for conveying document originals;
   said document conveyance unit being furnished with a sheet supply tray for carrying document originals, conveyance means for conveying documents from the sheet supply tray while turning them over from front to back, and a sheet discharge tray disposed below the sheet supply tray and above the platen, for storing documents conveyed by the conveyance means; and
   said image-capturing unit being furnished with
      a reading unit having a first photoreceptor unit and a second photoreceptor unit arranged in a row along an image-capture sub-scanning direction, a delay circuit for delaying output from said first photoreceptor unit, and an adding circuit for adding first-photoreceptor output delayed by said delay circuit to output from said second photoreceptor unit,
      a scanning unit supported to be shiftable along said platen so as to guide light, reflected from a document original placed on said platen, sequentially into said first photoreceptor unit and said second photoreceptor unit,
      a drive unit for shifting said scanning unit, and
      a control unit for controlling said reading unit and said drive unit;
   wherein:
      said control unit is configured so as to control, during a moving-original data-capture mode in which data capture from a document conveyed by said document conveyance unit is performed, said drive unit and said reading unit to carry out data capture from the conveyed document by halting said scanning unit at a preestablished reading position at one end-ward side of said platen, and so as to control, during a still-original data-capture mode in which data capture from a document placed on said platen is performed, said reading unit and said drive unit to carry out data capture from the document while shifting said scanning unit from the other end-ward side of said platen toward the one end-ward side thereof.

2. The image-capturing apparatus according to claim 1, wherein the still-original data-capture mode has two selectable data-capture modes, an addition data-capture mode in which output from said first photoreceptor unit is added the to output from said second photoreceptor unit, and a non-addition data-capture mode in which output from only either said first photoreceptor unit or from said second photoreceptor unit is used.

3. The image-capturing apparatus according to claim 2, wherein:
   in the addition data-capture mode data is captured from a stationary document by shifting said scanning unit from the other end-ward side of said platen toward the one end-ward side thereof; and
   in the non-addition data-capture mode data is captured from a stationary document by shifting said scanning unit from the one end-ward side of said platen toward the other end-ward side thereof.

4. The image-capturing apparatus according to claim 1, wherein a blocking member for a document to butt against edgewise when the document is placed on said platen is disposed on the other end-ward side of said platen.

5. The image-capturing apparatus according to claim 1, further comprising a first detection means and a second detection means at both end-portions of range across which said scanning unit shifts, for detecting the presence/absence of said scanning unit.

6. The image-capturing apparatus according to claim 1, wherein after a document is sensed to have been placed on said platen, said scanning unit is shifted in the direction heading toward the other end of said platen.

7. The image-capturing apparatus according to claim 6, further comprising a reference member for acquiring a data-capture reference value, wherein said reading unit, in the interval in which said scanning unit is shifted in the direction heading toward the other end of said platen, acquires a first reference value and a second reference value, based on said reference member, via said first photoreceptor and said second photoreceptor.

8. The image-capturing apparatus according to claim 7, wherein said reading unit, in the interval in which said scanning unit is shifted in the direction heading toward the other end of said platen, detects size of a document placed on said platen.

9. The image-capturing apparatus according to claim 6, further comprising detection means for detecting open/closed state of said document conveyance unit as being supported to be openable off of/closable onto said platen, wherein detection of a document as having been placed on said platen is performed by said detection means.

10. The image-capturing apparatus according to claim 6, wherein detection of a document as having been placed on said platen is carried out by detecting that said document conveyance unit has been closed onto, after having been opened off of, said platen.

* * * * *